Patented May 29, 1934

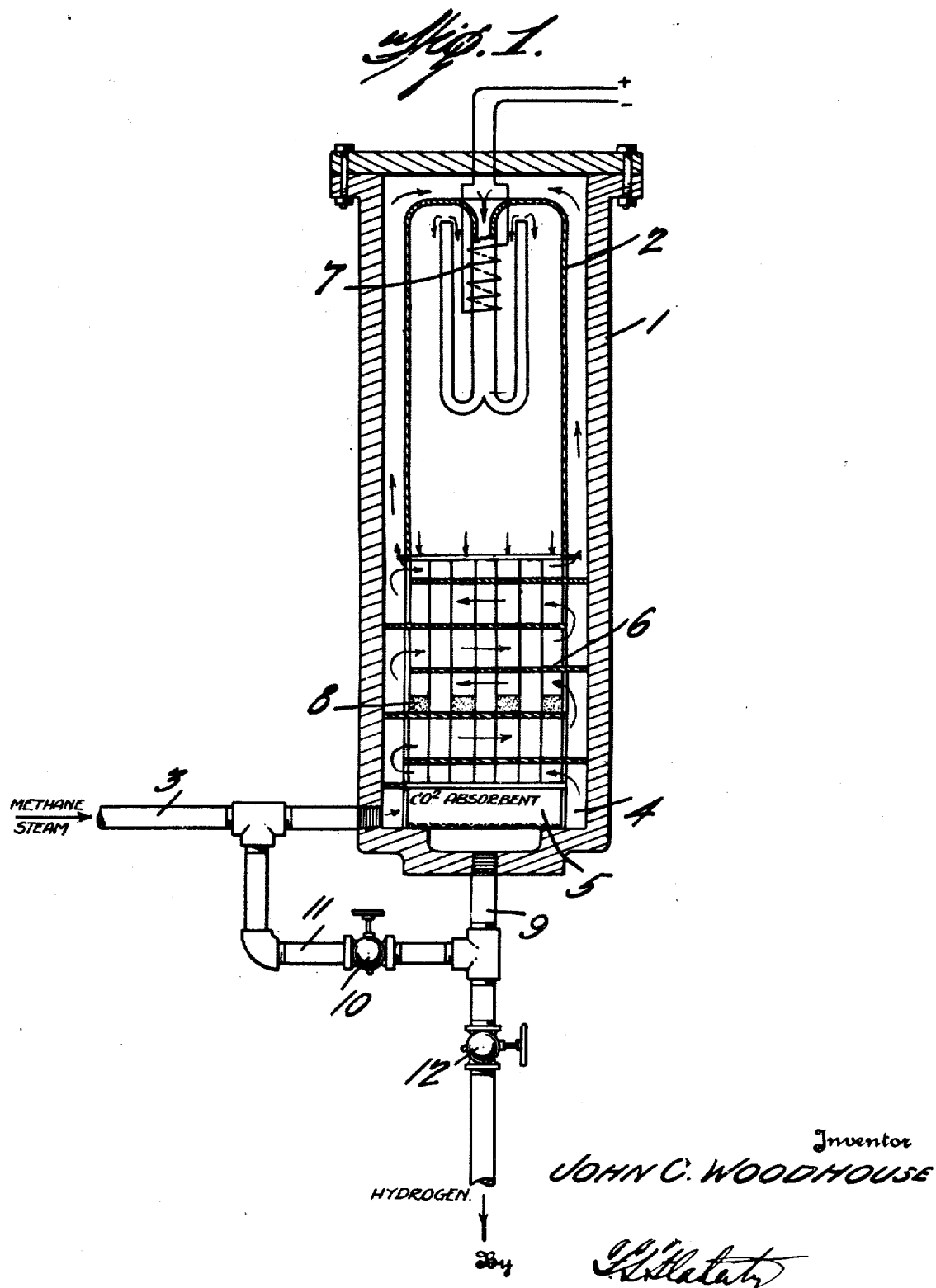

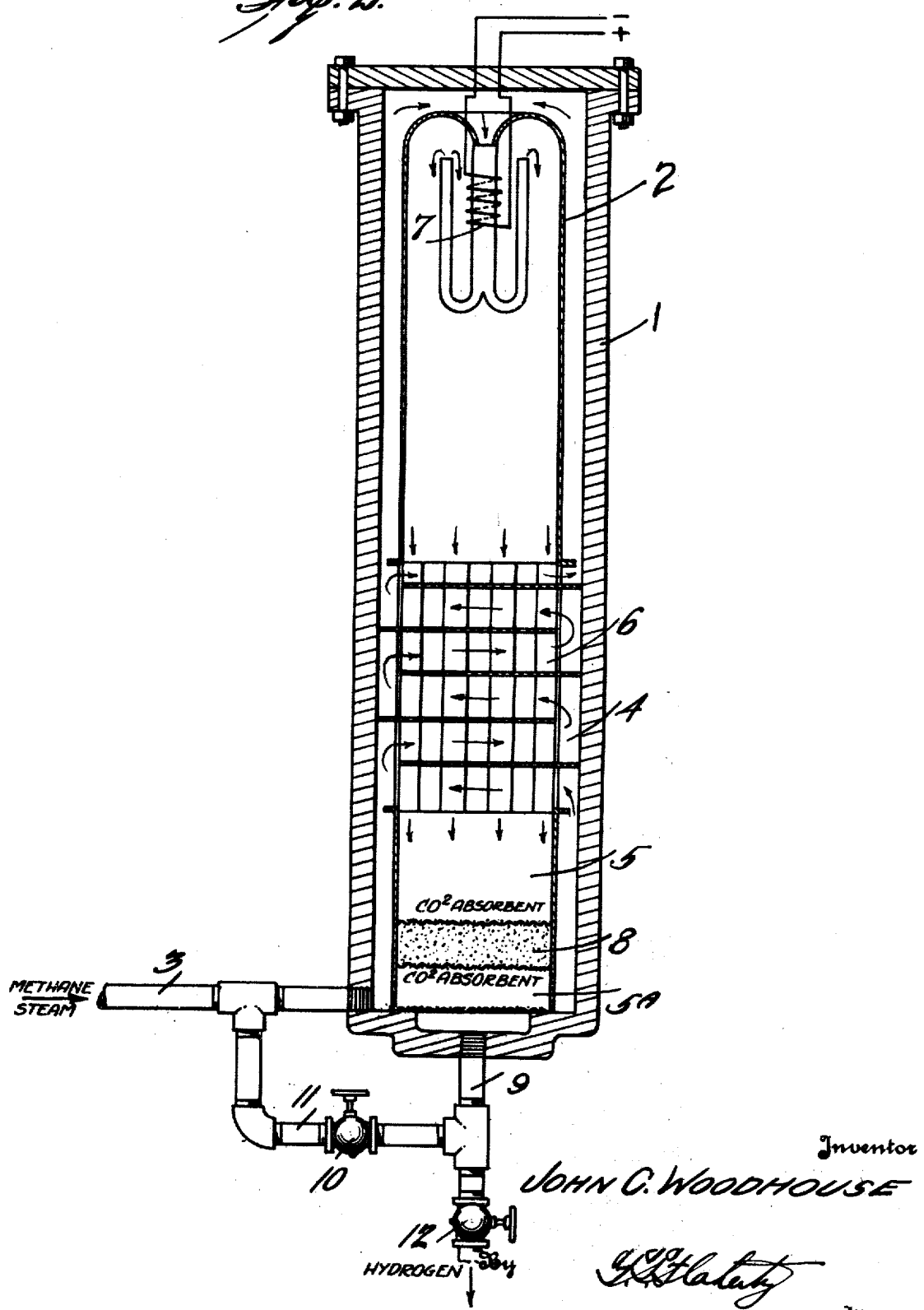

1,960,886

UNITED STATES PATENT OFFICE 1,960,886

PROCESS FOR THE PREPARATION OF HYDROGEN

John C. Woodhouse, Wilmington, Del., assignor, by mesne assignments, to E. I. du Pont de Nemours & Company, Wilmington, Del., a corporation of Delaware Application September 30, 1930, Serial No. 485,452

7 Claims. (Cl. 23—212)

This invention relates to a process for the manufacture of hydrogen from a mixture of a hydrocarbon and steam in the presence of a catalyst and particularly to the preparation of hydrogen free from carbon-containing compounds.

The preparation of hydrogen from hydrocarbons has been extensively investigated for the past fifty years. During the early part of that period the studies were based primarily upon trial and error methods but more recently chemical equilibrium reactions and physical chemical considerations have been the basis of the work. The hydrocarbons which have been generally utilized in this process of manufacture include the paraffins, particularly methane, ethane, propane, etc. When methane or a methane-containing gas is employed in the preparation of hydrogen in the presence of steam it is believed that the following are the major chemical reactions that will obtain:

$$CH_4 + H_2O = CO + 3H_2$$
$$CH_4 + 2H_2O = CO_2 + 4H_2$$

and in the commercial manufacture of hydrogen from methane or equivalent sources it is important that the second of the above two reactions be favored, for in effect the carbon monoxide formed in the first reaction is potential hydrogen, and its presence indicates a loss in obtainable hydrogen. This is partially accomplished by maintaining the temperature of the reaction at a low point,—for it can be shown, both by theoretical and experimental data, that at temperatures above 700° C. the first of the above reactions will proceed to a considerable extent with the result, that carbon monoxide is present in the produced gases, while if a temperature somewhat below 700° C. the reaction will be inhibited with a resultant decrease in the quantity of carbon monoxide produced. As would be expected, however, it is not commercially feasible to completely suppress the second reaction by temperature regulation and appreciable losses are experienced, therefore, due to the first reaction taking place simultaneously with the second, with the production of considerable carbon monoxide.

Together with the above considerations, of the suppression of carbon monoxide production, means of upsetting the equilibrium reaction in order to favor hydrogen production must be devised. Various expedients have been suggested to force these reactions practically to completion. The employment of a large excess of steam over and above that amount theoretically required, as well as the absorption of carbon dioxide by means of solution processes under pressure and of absorption processes, have afforded some success. Absorption media which may be used in the latter method of controlling the reaction are described in my co-pending applications, Ser. Nos. 461,856 and 465,239.

An object of this invention is to provide a process for the manufacture of hydrogen by the conversion of a hydrocarbon in the presence of steam and a suitable catalyst. Another object of this invention is to conduct such a process in which the carbon dioxide and carbon monoxide formed during the methane conversion is removed from the reaction products. A further object of this invention is to provide a process for the preparation of hydrogen from methane in which the carbon dioxide in the gases from the methane conversion are absorbed and the carbon monoxide converted into carbon dioxide which is likewise ultimately absorbed and removed from the produced hydrogen.

Other objects and advantages of the invention, which will hereinafter appear will be more readily understood by reference to the following specification and to the accompanying drawings; in which like parts are indicated by like reference characters throughout and in which—

Figure 1 is a diagrammatical drawing of a catalyst chamber adapted for the practice of the invention; and Figure 2 is a similar view showing another form of the catalyst chamber.

I have found that hydrogen can be more economically produced and in a high degree of purity by conducting the steam: hydrocarbon reaction in the presence of a suitable catalyst providing means be employed not only for the removal of the carbon dioxide from the reaction but likewise the carbon monoxide which has been simultaneously formed therewith. By conducting the process in this manner even though a fairly high percentage of carbon monoxide be formed, due to local heating of the catalyst or to any other conditions of operation, a high yield of hydrogen will result. By my method of operation it is readily conceivable why results are obtained which would not be expected from a study of the prior art because I not only employ an excess of steam and the removal of carbon dioxide to force the above reaction to the right but also remove the carbon monoxide formed by conversion or other means and, furthermore, preferably effect the removal of the carbon monoxide and carbon dioxide in such a manner that the formation of hydrogen is favored.

Generally speaking, my process may be conducted in the following manner. The hydrocarbon-containing gas, such as natural gas, coal gas, etc., is converted by any of the suitable catalytic conversion processes and preferably at a temperature below 700° C. in order that a minimum amount of carbon monoxide be formed, the gas from this conversion process may be passed through a carbon dioxide absorber such as those described in my co-pending applications noted above. The absorption being preferably conducted at a temperature of between 300 and 350° C., although, as is disclosed in my co-pending applications, such temperatures for the absorption of the carbon dioxide may vary considerably beyond these limits. The gases from the carbon dioxide absorber are next passed through a carbon monoxide converter in the presence of a suitable water gas conversion catalyst and at approximately the same temperature at which the carbon dioxide absorption was conducted. The gases from this converter now contain a very low percentage of carbon monoxide in the neighborhood of say 0.2% or less with a low percentage of carbon dioxide, together with a high percentage of hydrogen and a methane content which will be determined by the efficiency of the methane converter, and a small amount of other gases.

In order that the production of hydrogen be favored and the chemical reactions noted above forced as far as possible to the right, it is advantageous to remove the carbon monoxide and the carbon dioxide from the reaction zone as quickly as possible. This I have been able to accomplish in several ways. The methane conversion may be effected in the presence of a catalyst which accelerates both the methane conversion and the carbon monoxide conversion reaction; many of the catalysts known to this art, for methane conversion, are of this type. For instance, the promoted nickel catalyst will accelerate the methane conversion as well as the carbon monoxide conversion reaction. If there be present with these catalysts an appreciable amount of a carbon monoxide absorber which will not destroy the activity of the catalyst, an absorber of this type may consist of magnesium oxide, calcium oxide and the like, the carbon dioxide formed is rapidly absorbed with a substantially complete conversion of the methane to hydrogen. This type of reaction is described in my co-pending application, Ser. No. 461,856.

Another method, whereby substantially continuous removal of the carbon monoxide and carbon dioxide from the reaction zone may be effected, is conducted by carrying out the methane conversion in accord with the process described in Roger Williams co-pending application Ser. No. 118,600 or any suitable conversion process and at a temperature of approximately 500° C. The gases from the converter in the same or different apparatus, are passed through a heat exchanger which may be employed to preheat the incoming gases, and at that point in the heat exchanger at which a temperature of approximately 250–450° C. is attained a low temperature carbon monoxide conversion catalyst is inserted. The carbon monoxide contacting with this catalyst is converted into carbon dioxide and hydrogen, due to the excess steam present, and the former may be absorbed in a chamber following the heat interchanger by any well known type of carbon dioxide absorber.

I have furthermore found that these gases can be quickly and efficiently removed by following the methane conversion which may be conducted at a temperature of 550° C. by a heat exchanger similar to that described above but with no carbon monoxide catalyst therein. Subsequent to the heat exchanger, the gases pass into an oxide of carbon removing chamber. The portions of this chamber with which the gases have first and last contact, contain a carbon dioxide absorber such as magnesium oxide, manganese oxide, calcium oxide and the like, while intermediate to these portions of this chamber there lies a carbon monoxide conversion catalyst. It has been found that owing to the rather low percentage of carbon monoxide found in this gas that this catalyst need be but ⅛ to 1/10 the volume of the conversion catalyst employed. While for reactions in which the maximum purity of gas is not essential, it is sufficient that the carbon monoxide catalyst be located in an intermediate position to the carbon dioxide absorption portions of the chamber. If a gas of high purity is desired, however, and maximum efficiency is looked for in this chamber, I have found that the carbon monoxide catalyst should be located approximately one-half to five-sixths the distance from the inlet portion thereof. By passing the gas through the methane conversion chamber heat exchanger and oxide of carbon removing chamber at a suitable space velocity, substantially all the oxides of carbon are removed and a high percentage conversion of the methane obtained. The optimum space velocity can be readily determined by two or three trials. By a repeated recirculation of the gases, say at a space velocity of 1000 to 3000, through either of the two last named modified processes conditions similar to those realized in the first process described above may be realized.

In the practical application of the invention, a catalyst chamber of any suitable form may be employed. It may, for example, be generally cylindrical in shape with an inlet for the gaseous mixture, and an outlet for said mixture situated, if desired, at either end thereof with intermediate portions of said chamber containing the methane conversion catalyst followed in succession by the heat exchanging apparatus, with or without the carbon monoxide conversion catalyst. If the heat exchanger does not hold the latter catalyst, it may be disposed in a chamber following the heat exchanger in which all the oxides of carbon may be removed from the converted gases. Various means may be employed for passing the incoming gases about the carbon dioxide absorbing chambers in order that the incoming gas may be preheated prior to conversion. Generally as this gas will not pick up sufficient heat from the exit gases and the carbon dioxide absorption chamber, some auxiliary heating means is advantageous, such as the well known types of electrical heat coils. Other types of apparatus may be employed but the following will serve to illustrate a preferred form of apparatus.

Referring now to Figure 1 of the drawings, 1 indicates a cylindrical shell in which the catalytic chamber for methane conversion 2 is concentrically located. The incoming gas consisting of methane and steam enters through the conduit 3 into the passage 4 about the carbon dioxide absorption chamber 5. The incoming gases pick up considerable heat from that evolved by the absorption of the carbon dioxide in chamber 5 and are then passed upwardly about the heat interchanging portion of the converter 6. The incoming gases are here further heated, are passed up around the conversion chamber 2 and may be raised to the exact temperature of the reaction by means of the electrically heating coil 7. Upon being heated to the correct temperature the gases pass into the conversion chamber 2, which contains a methane conversion catalytic mass, from which they pass into the heat exchanging tubes 6. At that portion in the heat exchanging tubes, where the gases attain a temperature which is suitable for the carbon monoxide conversion reaction, I insert the carbon monoxide conversion catalyst 8, any well known carbon monoxide conversion catalyst such as iron oxide is suitable. The gases from this conversion next pass through the carbon dioxide absorption chamber 5 and exit through conduit 9. If the gases are to be recirculated the by-pass valve 10 is opened in conduit 11 and with a correct regulation of valve 12 in conduit 9, the operator is thus enabled to control the amount of gas recirculated through the system.

In Figure 2, we have a similar converter to that described in Figure 1. It will be noted that in this converter there is no carbon monoxide conversion catalyst in the heat interchange tubes 6 and likewise that the oxide of carbon removing chamber designated in Figure 1 by the numeral 5 in Figure 2, consists of a carbon dioxide absorbing chamber 5 followed by a carbon monoxide conversion chamber 8 which is likewise followed by a carbon dioxide absorbing chamber 5—A. The operation of this converter is very similar to the converter described in Figure 1, except that the gases from the methane conversion chamber 2, which are at a temperature of approximately 400-650° C. pass into the heat exchanger 6 which lowers the temperature of these gases to approximately 250-450° C. At this temperature the carbon dioxide is first removed from the gases in chamber 5. They are then passed through the carbon monoxide conversion chamber 8 in which the carbon monoxide content is lowered to practically zero, with a corresponding increase in carbon dioxide, which is removed in the final carbon dioxide absorption chamber 5—A. This process may be rendered substantially continuous by providing two or more reaction vessels such as those described above, so that while one is being used for methane conversion, the other may be in the process of reactivation that is the carbon dioxide absorption medium, which, of course, becomes saturated with carbon dioxide, must be treated so that the carbon dioxide it contains is removed, thus fitting it for reuse. If desired, the reaction vessels may be adapted for the continuous withdrawal of the carbon dioxide absorption material whereby but one converter would be required.

As the methane conversion reaction is an endothermic reaction, that is external or internal heat being required to maintain its temperature at a sufficiently high value for efficient operation, and the carbon dioxide absorption process is an exothermic reaction in which the cooling must be resorted to to maintain a given temperature, it will readily be realized that the heat evolved in the latter may be well employed in the former to aid in the maintenance of the reaction temperature by heat exchange with a resultant heat saving.

While I have spoken primarily of the removal of carbon dioxide by various absorbers which have been disclosed in my copending application as magnesium oxide and manganese oxide, various other absorbers of a similar and equivalent activity may be used, or for that matter, the carbon dioxide at the pressure of the reaction, which will be in the neighborhood of ten or more atmospheres, may be dissolved under pressure in a suitable liquid. Furthermore, in some instances it may be preferable to remove the carbon monoxide by some process other than the catalytic conversion to carbon dioxide and hydrogen. The employment of preferential combustion may in such instances be used or any other suitable method of removing the carbon monoxide from the reaction, the primary function of the removal of the carbon monoxide and carbon dioxide simultaneously being to continuously upset the equilibrium reaction whereby a high percentage conversion of the hydrocarbon will result.

I will now give one manner of conducting my process but it will be understood that I shall not be restricted by the proportions, ingredients, or other data therein given, the example being merely by way of illustration.

Crush pumice stone and screen to 8–14 mesh. Wash with boiling hydrochloric acid until free from iron and then with boiling distilled water until free from chlorides. After drying at 200° C. stir 100 parts at that temperature into a boiling solution of 50 parts of nickel nitrate and 2.6 parts of cerium nitrate, all of which should be free from sulphur, halogens and other contact poisons, in 70 parts of distilled water. After absorption is complete remove the pumice from the solution and calcine it at 400° C. until the nitrogen oxides have been expelled. Place the product in a silica tube in an electrically heated furnace and heat for one hour in a stream of pure hydrogen at 400° C. The prepared catalyst may then be placed in chamber 2 of Figure 2, shown in the drawings, and a mixture of 10 volumes of steam and one volume of methane at a pressure of 10 atmospheres passed over it after the gas has been freed from contact poisons, by passage over hot copper and through activated charcoal, for example. Maintain a temperature of 550° C. in the catalyst chamber and a space velocity of 250, based on methane. (The space velocity is the volume of gas flowing under standard conditions of temperature and pressure per unit volume of catalyst per hour.) The issuing gases should contain 75.7 to 76.8 of hydrogen, 4.9— to 3.5— of methane, 17.5 to 17.6+ of carbon dioxide and approximately 2% of carbon monoxide (on a dry basis). This gas, cooled by heat exchange to 200–350° C., is then passed into a chamber 5 containing magnesium oxide. Three-fourths way through this absorber is inserted a tray of the water-gas catalyst, iron oxide, for example, equal to one-eighth of the volume of the methane catalyst, followed by a second carbon dioxide absorber. If lime be used as an absorbent a much higher temperature, say 500–550° C., may be maintained in the absorption chamber. My co-pending applications cited above disclose the more suitable temperatures for the particular absorbent. The gas evolved by the absorbent will have approximately the following composition: 94.2 to 95.8% hydrogen, 3.9+ to 5.6— methane, no carbon dioxide and less than 0.2% carbon monoxide. This gas may be then recirculated through the system whereby there will be obtained substantially pure hydrogen.

From the consideration of the above specification it will be realized that any process for the preparation of hydrogen by the interaction of steam and a hydrocarbon in the presence of a catalyst in which the carbon monoxide and carbon dioxide are substantially simultaneously removed either by absorption of the one or by conversion or preferential combustion of the other will come within the scope of this invention without sacrificing any of the advantages that may be derived therefrom.

I claim:

1. A process for the manufacture of hydrogen by the interaction in the vapor phase of steam and methane which comprises subjecting methane and steam together with the vapors resulting from the methane conversion reaction at a high velocity and successively to the cycle methane conversion at a temperature of 550° C., carbon monoxide conversion, and carbon dioxide absorption at a temperature of 250-450° C. whereby the methane conversion reaction is substantially continuously displaced.

2. A process for the manufacture of hydrogen by the interaction in the vapor phase of steam and methane which comprises subjecting methane and steam together with the vapors resulting from the methane conversion reaction at a space velocity of 1000 to 3000 and successively to the cycle methane conversion at a temperature of 550° C., carbon monoxide conversion, and carbon dioxide absorption at a temperature of 250-450° C. whereby the methane conversion reaction is substantially continuously displaced.

3. A process for the manufacture of hydrogen by the interaction in the vapor phase of steam and a hydrocarbon which comprises contacting the hydrocarbon and steam with a hydrocarbon conversion catalyst at a temperature of 400-650° C., cooling the conversion gases by heat exchange with the incoming hydrocarbon and steam to a temperature of 250-450° C., and subsequently removing the carbon dioxide by absorption and the carbon monoxide by conversion at this temperature.

4. A process for the manufacture of hydrogen by the interaction in the vapor phase of steam and a hydrocarbon which comprises contacting the hydrocarbon and steam with a hydrocarbon conversion catalyst at a temperature of 400-650° C., cooling the converted gases to a temperature of 250-550° C., removing the oxides of carbon and recirculating the gases through the above cycle whereby the methane conversion reaction is substantially continuously displaced.

5. A process for the manufacture of hydrogen by the interaction in the vapor phase of steam and a hydrocarbon which comprises contacting a hydrocarbon and steam with a hydrocarbon conversion catalyst at a temperature of 400-650° C., cooling the converted gases by heat exchange to a temperature of 250-550° C., at which temperature they contact with a carbon monoxide conversion catalyst, and recirculating the gases through the same or a similar series of steps whereby the methane conversion reaction is substantially continuously displaced.

6. In a process for the manufacture of hydrogen by the interaction in the vapor phase of steam and a hydrocarbon, the steps which comprise subjecting the hydrocarbon to the action of steam in the presence of a hydrocarbon: steam conversion catalyst, and removing the carbon dioxide present by adsorption and the carbon monoxide by conversion, the gases from the methane: steam conversion contacting successively the carbon dioxide adsorption portion, the carbon monoxide conversion portion, and the carbon dioxide absorption portion of the medium, the gases having traversed approximately one-half to five-sixths of the carbon oxide absorbing medium prior to entering the carbon monoxide conversion portion thereof.

7. In a process for the manufacture of hydrogen by the interaction in the vapor phase of steam and a hydrocarbon, the steps which comprise subjecting the hydrocarbon to the action of steam in the presence of a hydrocarbon: steam conversion catalyst, and removing the carbon dioxide present by absorption and the carbon monoxide by conversion, the gases from the methane: steam conversion contacting successively the carbon dioxide absorption portion, the carbon monoxide conversion portion, and the carbon dioxide absorption portion of the medium, the volume of the catalyst in the carbon monoxide conversion portion of the carbon oxide absorption medium being one-eighth to one-tenth the volume of the hydrocarbon conversion catalyst.

JOHN C. WOODHOUSE.

---

CERTIFICATE OF CORRECTION.

Patent No. 1,960,886.

May 29, 1934.

JOHN C. WOODHOUSE.

It is hereby certified that error appears in the printed specification of the above numbered patent requiring correction as follows: Page 4, lines 92 and 95, claim 6, for "adsorption" read absorption; and that the said Letters Patent should be read with these corrections therein that the same may conform to the record of the case in the Patent Office.

Signed and sealed this 11th day of September, A. D. 1934.

Leslie Frazer (Seal)

Acting Commissioner of Patents.

and methane which comprises subjecting methane and steam together with the vapors resulting from the methane conversion reaction at a high velocity and successively to the cycle methane conversion at a temperature of 550° C., carbon monoxide conversion, and carbon dioxide absorption at a temperature of 250-450° C. whereby the methane conversion reaction is substantially continuously displaced.

2. A process for the manufacture of hydrogen by the interaction in the vapor phase of steam and methane which comprises subjecting methane and steam together with the vapors resulting from the methane conversion reaction at a space velocity of 1000 to 3000 and successively to the cycle methane conversion at a temperature of 550° C., carbon monoxide conversion, and carbon dioxide absorption at a temperature of 250-450° C. whereby the methane conversion reaction is substantially continuously displaced.

3. A process for the manufacture of hydrogen by the interaction in the vapor phase of steam and a hydrocarbon which comprises contacting the hydrocarbon and steam with a hydrocarbon conversion catalyst at a temperature of 400-650° C., cooling the conversion gases by heat exchange with the incoming hydrocarbon and steam to a temperature of 250-450° C., and subsequently removing the carbon dioxide by absorption and the carbon monoxide by conversion at this temperature.

4. A process for the manufacture of hydrogen by the interaction in the vapor phase of steam and a hydrocarbon which comprises contacting the hydrocarbon and steam with a hydrocarbon conversion catalyst at a temperature of 400-650° C., cooling the converted gases to a temperature of 250-550° C., removing the oxides of carbon and recirculating the gases through the above cycle whereby the methane conversion reaction is substantially continuously displaced.

5. A process for the manufacture of hydrogen by the interaction in the vapor phase of steam and a hydrocarbon which comprises contacting a hydrocarbon and steam with a hydrocarbon conversion catalyst at a temperature of 400-650° C., cooling the converted gases by heat exchange to a temperature of 250-550° C., at which temperature they contact with a carbon monoxide conversion catalyst, and recirculating the gases through the same or a similar series of steps whereby the methane conversion reaction is substantially continuously displaced.

6. In a process for the manufacture of hydrogen by the interaction in the vapor phase of steam and a hydrocarbon, the steps which comprise subjecting the hydrocarbon to the action of steam in the presence of a hydrocarbon: steam conversion catalyst, and removing the carbon dioxide present by adsorption and the carbon monoxide by conversion, the gases from the methane: steam conversion contacting successively the carbon dioxide adsorption portion, the carbon monoxide conversion portion, and the carbon dioxide absorption portion of the medium, the gases having traversed approximately one-half to five-sixths of the carbon oxide absorbing medium prior to entering the carbon monoxide conversion portion thereof.

7. In a process for the manufacture of hydrogen by the interaction in the vapor phase of steam and a hydrocarbon, the steps which comprise subjecting the hydrocarbon to the action of steam in the presence of a hydrocarbon: steam conversion catalyst, and removing the carbon dioxide present by absorption and the carbon monoxide by conversion, the gases from the methane: steam conversion contacting successively the carbon dioxide absorption portion, the carbon monoxide conversion portion, and the carbon dioxide absorption portion of the medium, the volume of the catalyst in the carbon monoxide conversion portion of the carbon oxide absorption medium being one-eighth to one-tenth the volume of the hydrocarbon conversion catalyst.

JOHN C. WOODHOUSE.

---

CERTIFICATE OF CORRECTION.

Patent No. 1,960,886.

May 29, 1934.

JOHN C. WOODHOUSE.

It is hereby certified that error appears in the printed specification of the above numbered patent requiring correction as follows: Page 4, lines 92 and 95, claim 6, for "adsorption" read absorption; and that the said Letters Patent should be read with these corrections therein that the same may conform to the record of the case in the Patent Office.

Signed and sealed this 11th day of September, A. D. 1934.

Leslie Frazer (Seal)

Acting Commissioner of Patents.